(12) United States Patent　　(10) Patent No.: US 12,687,216 B2
Nilsson et al.　　(45) Date of Patent: Jul. 21, 2026

(54) FLYWHEEL ARRANGEMENT, A VEHICLE AND A METHOD OF MANUFACTURING A FLYWHEEL ARRANGEMENT

(71) Applicant: Volvo Truck Corporation, Gothenburg (SE)

(72) Inventors: Ola Nilsson, Varberg (SE); Pär Öhrfeldt, Mölnlycke (SE); Ödül Bilen, Hisings Backa (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/606,038

(22) PCT Filed: Apr. 25, 2019

(86) PCT No.: PCT/EP2019/060651
§ 371 (c)(1),
(2) Date: Oct. 24, 2021

(87) PCT Pub. No.: WO2020/216446
PCT Pub. Date: Oct. 29, 2020

(65) Prior Publication Data
US 2022/0205511 A1　Jun. 30, 2022

(51) Int. Cl.
F16F 15/14　　(2006.01)
(52) U.S. Cl.
CPC ........ F16F 15/145 (2013.01); F16F 2222/08 (2013.01); F16F 2224/0208 (2013.01);
(Continued)
(58) Field of Classification Search
CPC ..................... F16F 2226/045; F16F 2230/007
See application file for complete search history.

(56) References Cited

U.S. PATENT DOCUMENTS

| | | | |
|---|---|---|---|
| 2,509,579 A | 5/1950 | Sharma | |
| 10,619,703 B2 | 4/2020 | Kawahara et al. | |

FOREIGN PATENT DOCUMENTS

| | | |
|---|---|---|
| AT | E46194 T1 | 9/1989 |
| CN | 101896735 A | 11/2010 |

(Continued)

OTHER PUBLICATIONS

International Search Report and Written Opinion of the International Searching Authority, PCT/EP2019/060651, dated Jan. 24, 2020, 12 pages.

(Continued)

*Primary Examiner* — Vicky A Johnson
(74) *Attorney, Agent, or Firm* — Sage Patent Group

(57)　　　　　ABSTRACT

A flywheel arrangement for an engine of a vehicle, includes:
a flywheel configured to be connected to a crankshaft of the engine for common rotation around a center axis,
a pendulum weight arranged between the center axis and a radially peripheral surface of the flywheel, the pendulum weight being movable with respect to the flywheel along a predetermined pendulum path,
a ring member positioned radially outside of the pendulum weight, the ring member being connected for common rotation with the flywheel around the center axis, and
at least one pair of cooperating bearing surfaces, each pair of cooperating bearing surfaces including an outer bearing surface provided on the ring member and an inner bearing surface provided on the pendulum weight, the at least one pair of cooperating bearing surfaces together defining the predetermined pendulum path.

14 Claims, 5 Drawing Sheets

(52) U.S. Cl.
CPC ..... *F16F 2226/04* (2013.01); *F16F 2226/045*
(2013.01); *F16F 2230/0023* (2013.01); *F16F*
*2230/007* (2013.01); *F16F 2232/02* (2013.01);
*F16F 2236/08* (2013.01)

(56)                References Cited

FOREIGN PATENT DOCUMENTS

| | | | | |
|----|----------------|-----|---------|-----------|
| CN | 103109087 | A   | 5/2013  | |
| CN | 103217883 | A   | 7/2013  | |
| CN | 207687259 | U   | 8/2018  | |
| DE | 10035489 | A1  | 1/2002  | |
| DE | 100354891 | A1  | 1/2002  | |
| DE | 102009042804 | A1 * | 6/2010 | ........... F16F 15/145 |
| EP | 2933527 | A1  | 10/2015 | |
| FR | 686278 | A1  | 7/1930  | |
| JP | 2019052715 | A   | 4/2019  | |

OTHER PUBLICATIONS

First Chinese Office Action for Chinese Patent Application No. CN 201980095345.0 mailed on Sep. 12, 2023, 8 pages (including English translation).

* cited by examiner

FLYWHEEL ARRANGEMENT, A VEHICLE AND A METHOD OF MANUFACTURING A FLYWHEEL ARRANGEMENT

CROSS REFERENCE TO RELATED APPLICATIONS

This application is a 35 U.S.C. § 371 national stage application of PCT International Application No. PCT/EP2019/060651 filed on Apr. 25, 2019, the disclosure and content of which is incorporated by reference herein in its entirety.

TECHNICAL FIELD

The invention relates to a flywheel arrangement for an engine and a method of manufacturing such a flywheel arrangement. The invention also relates to a vehicle comprising such a flywheel arrangement.

The invention can be applied in vehicles, such as trucks, buses and construction equipment. Although the invention will be described with respect to heavy-duty trucks, the invention is not restricted to this particular vehicle, but may also be used in other vehicles such as light-weight trucks, articulated haulers, excavators, wheel loaders, and backhoe loaders.

BACKGROUND

It is known to connect a flywheel to a crankshaft of an internal combustion engine for a vehicle. The flywheel is used for evening out the uneven power output from the engine, which is caused by uneven power output from each cylinder of the engine during the cylinder's combustion cycle.

It is further known to connect a centrifugal pendulum absorber to the flywheel for reducing vibrations from the crankshaft. Vibrations are common for most engines, but have been found to be more common for more fuel efficient engines. By the trend of reducing fuel consumption, vibrations have become a more common issue in modern vehicles. Centrifugal pendulum absorbers for flywheels include a number of pendulum weights arranged circumferentially around a center axis of the flywheel, which pendulum weights are movable with respect to the flywheel, thereby dampening vibrations.

An example of a centrifugal pendulum device is disclosed in DE102016205765 A1. It discloses a centrifugal pendulum device which comprises one or more pendulum weights which can perform pendulum motions relative to a carrier disc. It further comprises a buffer ring which is arranged between the rotation axis and the pendulum weights, wherein the ring can perform a frictional sliding movement relative to the carrier disk by the pendulum motions.

As for most mechanical components which are frequently used, a centrifugal pendulum absorber requires to be serviced and certain parts thereof may need to be replaced after a certain time due to wear. This is especially the case when the centrifugal pendulum absorber is connected to larger engines providing high power outputs, such as engines for heavy-duty trucks.

To minimize service costs, it is desirable to improve the durability of the centrifugal pendulum absorber.

SUMMARY

A primary object of the invention is to provide a flywheel arrangement for an engine, such as an internal combustion engine, which flywheel arrangement is in at least some aspect improved in comparison with prior art solutions. In particular, it is an object to provide a flywheel arrangement including a centrifugal pendulum absorber, which flywheel arrangement combines a good ability to withstand contact stresses arising during relative motion of the pendulum weights with a good damping ability of the flywheel itself. Another object is to provide an in at least some aspect improved method of manufacturing such a flywheel arrangement.

At least the primary object is achieved by the flywheel arrangement according to claim 1. The flywheel arrangement comprises:

a flywheel configured to be connected to a crankshaft of the engine for common rotation around a center axis, at least one pendulum weight arranged between the center axis and a radially peripheral surface of the flywheel, the at least one pendulum weight being movable with respect to the flywheel along a predetermined pendulum path, a ring member positioned radially outside of the at least one pendulum weight, the ring member being connected for common rotation with the flywheel around the center axis, at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight.

Thus, the flywheel arrangement comprises a centrifugal pendulum absorber. An advantage of the proposed flywheel arrangement is that the ring member and the flywheel may be made as separate parts, which are assembled when manufacturing the flywheel arrangement. Different materials may thereby be used for the ring member and the flywheel, and material properties of each component may consequently be tailored to suit the requirements on that particular component. For example, it is usually desirable to have a relatively high thermal conductivity of the flywheel, in order to dissipate heat resulting from clutch slip of a clutch being in engagement with the flywheel. However, a lower heat conductivity may be accepted for the ring member. The ring member on the other hand needs to have a relatively high hardness and strength in comparison with the flywheel. In particular, this is the case for the outer bearing surface(s), which is (are) subjected to contact stresses as a result of the friction arising during relative movement of the pendulum weight on one hand and the ring member/flywheel on the other hand. Therefore, it is advantageous to be able to make the flywheel and the ring member as separate parts of different materials.

Another advantage of the proposed flywheel arrangement is that, since the ring member is positioned radially outside of the pendulum weight(s), the bearing surfaces are positioned outside of a center of mass of the pendulum weight(s). This enables the use of a lubricant, which during use of the flywheel arrangement will be thrown outwards, keeping the bearing surfaces lubricated. Friction between the components of the centrifugal pendulum absorber may thereby be reduced and the durability may be improved.

The predetermined pendulum path herein lies within a plane perpendicular to the center axis. The predetermined pendulum path may be a tautochrone curve.

The inner bearing surface is herein provided on a radially outer peripheral surface of the pendulum weight, facing the ring member. The inner bearing surface and the outer bearing surface are, during use of the flywheel arrangement, configured to be movable with respect to each other, i.e. the bearing surfaces can be understood as raceways.

Preferably, the flywheel arrangement comprises a plurality of pendulum weights arranged circumferentially around the center axis of the flywheel. For example, the number of pendulum weights may be 3-7 pendulum weights, such as five (5) pendulum weights.

According to one embodiment, the flywheel arrangement further comprises at least one rolling element, such as a roller, positioned between and configured to cooperate with the at least one pair of cooperating bearing surfaces to provide the predetermined pendulum path. Thus, in this embodiment, the pair of cooperating bearing surfaces together with the rolling element define the pendulum path. The rolling element contributes to reduced friction and is also useful for achieving a pendulum path in the form of a tautochrone curve. In this embodiment, the at least one pair of cooperating bearing surfaces may be concave surfaces facing one another.

According to one embodiment, for each pendulum weight, the at least one pair of cooperating bearing surfaces comprises two angularly spaced pairs of cooperating bearing surfaces. The pendulum weight may be mirror symmetric with respect to a plane including the center axis, said plane extending halfway between the two angularly spaced pairs of cooperating bearing surfaces. Such a pendulum weight is also referred to as a bifilar pendulum weight. With a rolling element such as a roller positioned between each pair of cooperating bearing surfaces, a predetermined pendulum path in the form of a tautochrone curve may be realized. This is beneficial for efficient vibration damping.

According to one embodiment, the outer bearing surface is formed at least partly on a protrusion of the ring member, the protrusion extending radially inwards from an annular main portion of the ring member.

According to one embodiment, the at least one pendulum weight comprises at least one pocket formed in connection with the inner bearing surface, the pocket being configured to receive at least a portion of the protrusion of the ring member when the pendulum weight moves along the predetermined pendulum path. The mass of the pendulum weight can thereby be increased, since the pendulum mass is able to overlap with the protrusion of the ring member during use. The increased mass leads to improved damping properties.

According to one embodiment, the flywheel is made of cast iron, preferably grey cast iron, and the ring member is made of a steel alloy, preferably a bearing steel alloy. Thereby, good damping properties and high thermal conductivity is achieved for the flywheel, while the ring member is provided with high strength and hardness, particularly important for the outer bearing surfaces. In one embodiment, a chromium-manganese-silicon bearing steel having high hardenability and tensile strength is used.

According to one embodiment, the flywheel arrangement further comprises a plurality of separate key members by means of which the ring member is secured to the flywheel, each key member being fitted into a keyseat provided in the flywheel and attached to the ring member. An advantage of this is that it allows the key members to carry equal or substantially equal tangential loads during use, since the key members may be fitted into the keyseats independently of each other and of the ring member. Thereby, a perfect fit between the key members and the keyseats may be obtained, without problems with fitting arising due to tolerances. The key members may be used as a complement to press-fitting the ring member to the flywheel.

Alternatively, the key members may be integrated, i.e. formed in one piece, with the ring member.

According to one embodiment, the key members and the ring member are made of the same material. Thus, the key members have the same material properties as the ring member.

According to one embodiment, each key member is attached to a radially extending connection portion of the ring member. The connection portion may extend inward from an annular main portion of the ring member. Thanks to the radial extension, relative movement of the ring member with respect to the flywheel in the tangential direction is efficiently prevented.

According to one embodiment, the at least one pendulum weight comprises at least two neighbouring pendulum weights, wherein the radially extending connection portion is arranged between the two neighbouring pendulum weights. The number of key members thus equals the number of pendulum weights, which may e.g. be 3-7 pendulum weights, such as five (5) pendulum weights.

According to one embodiment, each key member is attached to the ring member by means of at least one fastening member, such as at least one pin. Alternatively, other types of nails or screws may be used. By using fastening members, it is easy to attach the ring member to the separate key members after mounting the key members and fitting the ring member to the flywheel. Preferably, at least two fastening members per key member are used.

According to one embodiment, the ring member is press-fitted to the flywheel. The flywheel is herein preferably provided with a peripheral flange, inside which an annular fitting portion of the ring member is fitted. The press-fitting efficiently prevents axial and radial movement of the ring member with respect to the flywheel. As described above, key members may additionally be used to prevent movement in the tangential direction.

According to one embodiment, the flywheel arrangement further comprises at least one stopping element positioned such that it defines an end point of the predetermined pendulum path, at which end point the at least one pendulum weight is configured to come into contact with the at least one stopping element, wherein the at least one stopping element is located radially inwardly with respect to the at least one pendulum weight. The stopping element prevents the pendulum weight from bumping into the ring member or the flywheel during use. The stopping element may be made as a separate part which is easier to replace than the ring member or the flywheel, thereby improving the lifetime of the flywheel arrangement.

The stopping element may preferably be made of a ductile material, such as a copper alloy, for example brass or bronze, whereby noise is reduced.

According to one embodiment, the flywheel arrangement further comprises a cover plate provided on a side face of the flywheel, which cover plate sealingly covers the pendulum weights. The cover plate protects the centrifugal pendulum absorber from clutch dust and it also enables forming one or more closed compartment(s), further delimited by a side face of the flywheel, the ring member, and if applicable the stopping element(s), in which closed compartment(s) the pendulum weight(s) is (are) arranged. This is particularly beneficial when a lubricant, such as grease, is used to lubricate the centrifugal pendulum absorber.

According to a second aspect of the invention, the invention relates to a vehicle comprising the proposed flywheel arrangement. The vehicle may be a heavy-duty vehicle, such as a bus or a truck, but it may also be another type of vehicle.

Advantages and effects provided by the vehicle are largely analogous to the advantages and effects provided by the first aspect of the invention. It shall also be noted that each embodiment of the first aspect of the invention is applicable with each embodiment of the second aspect of the invention and vice versa.

According to a third aspect of the invention, at least one of the above defined objects is achieved by a method of manufacturing the proposed flywheel arrangement according to the independent method claim. The method comprises:

providing a flywheel configured to receive the at least one pendulum weight and the ring member, press-fitting the ring member to the flywheel and subsequently machining the ring member to form the at least one outer bearing surface, mounting the at least one pendulum weight between the center axis and the radially peripheral surface of the flywheel.

By machining the ring member to form the at least one outer bearing surface subsequently to press-fitting the ring member to the flywheel, it is avoided that the outer bearing surfaces are deformed upon press-fitting the ring member to the flywheel. Thus, a better shape accuracy is achieved, leading to a better control of the predetermined pendulum path and thereby of the kinematic properties of the flywheel arrangement.

Advantages and effects provided by the method are largely analogous to the advantages and effects provided by the first aspect of the invention. It shall also be noted that each embodiment of the first aspect of the invention is applicable with each embodiment of the third aspect of the invention and vice versa.

According to one embodiment, the method further comprises the steps of:

prior to press-fitting the ring member, fitting a plurality of key members into keyseats of the flywheel, after press-fitting the ring member, attaching radially extending connection portions of the ring member to the plurality of key members.

The step of attaching radially extending connection portions of the ring member to the plurality of key members may comprise drilling at least one hole extending through each connection portion and into the key member. Fastening members such as nails, pins or screws are thereafter used to attach the ring member via the drilled holes.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
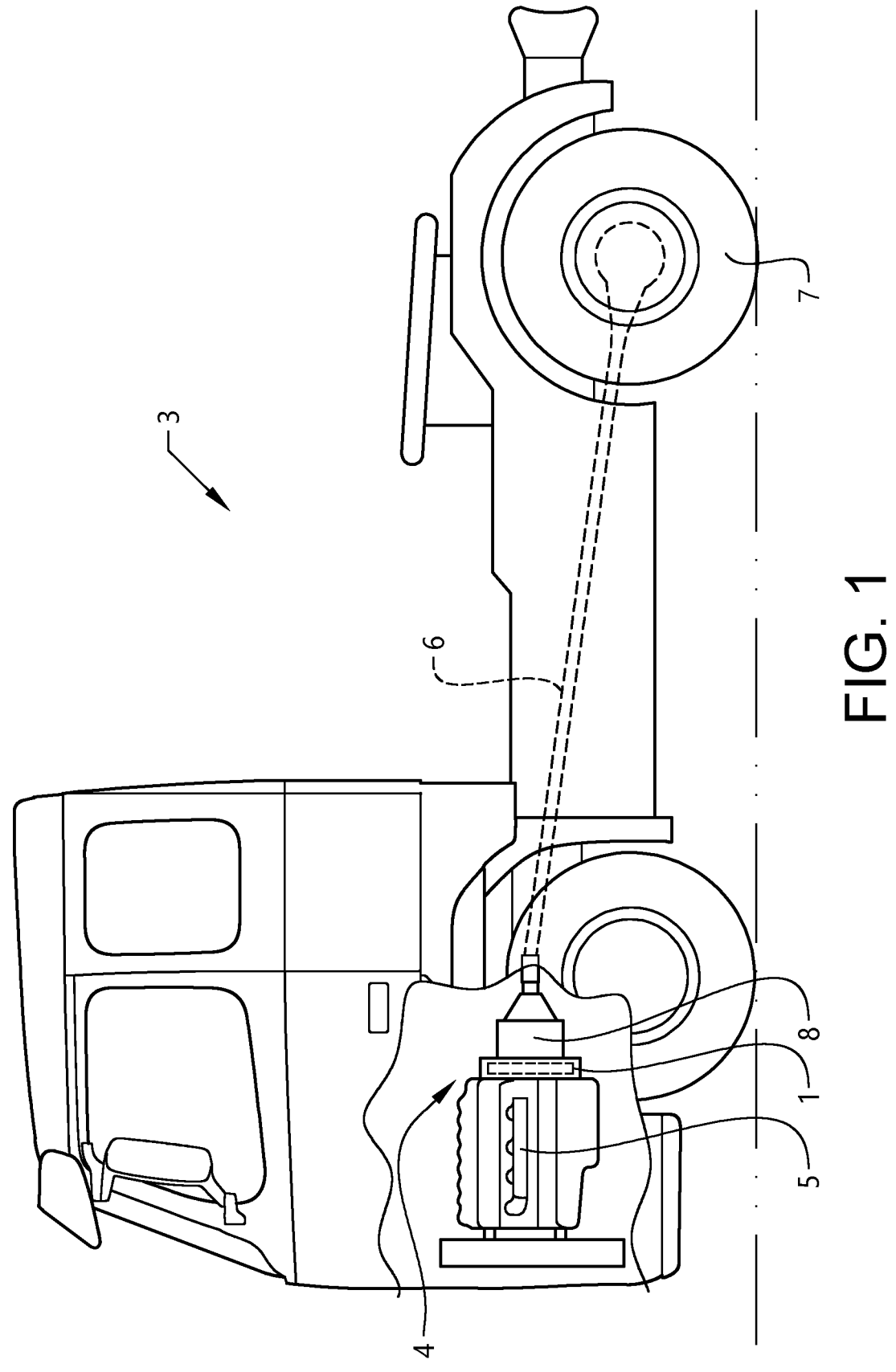
FIG. 1 schematically shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 schematically shows a vehicle 3 according to an embodiment of the invention. The vehicle 3 includes a powertrain 4 with an engine 5 connected to a crankshaft (not shown), to which a flywheel arrangement 1 is connected for common rotation. A drive shaft 6 connects the engine 5 to driving wheels 7 of the vehicle 3 via a transmission 8 connected to the flywheel via a clutch (not shown).

Figure 2:
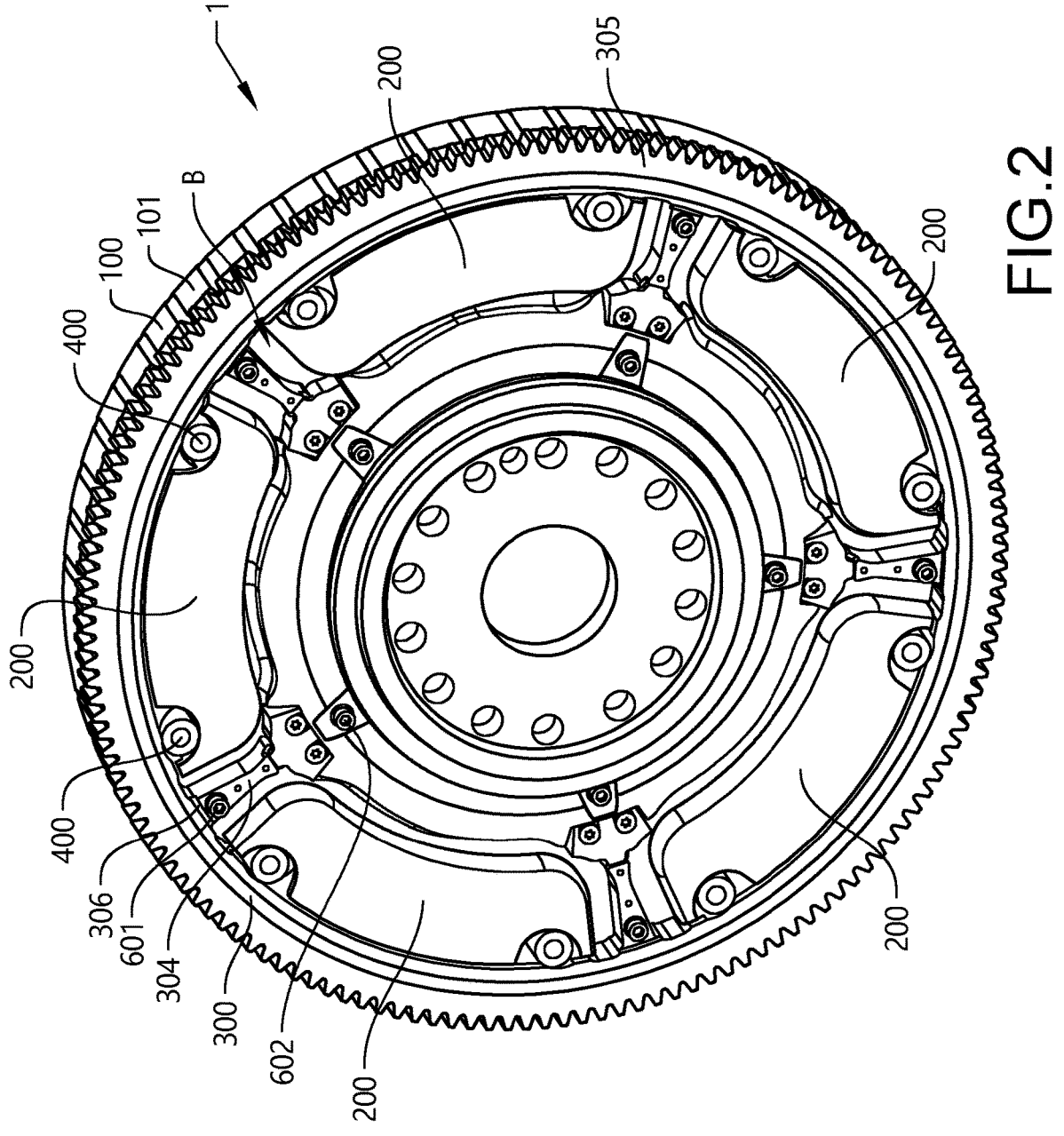
FIG. 2 is a perspective view of a flywheel according to an embodiment of the invention.
Figure 3:
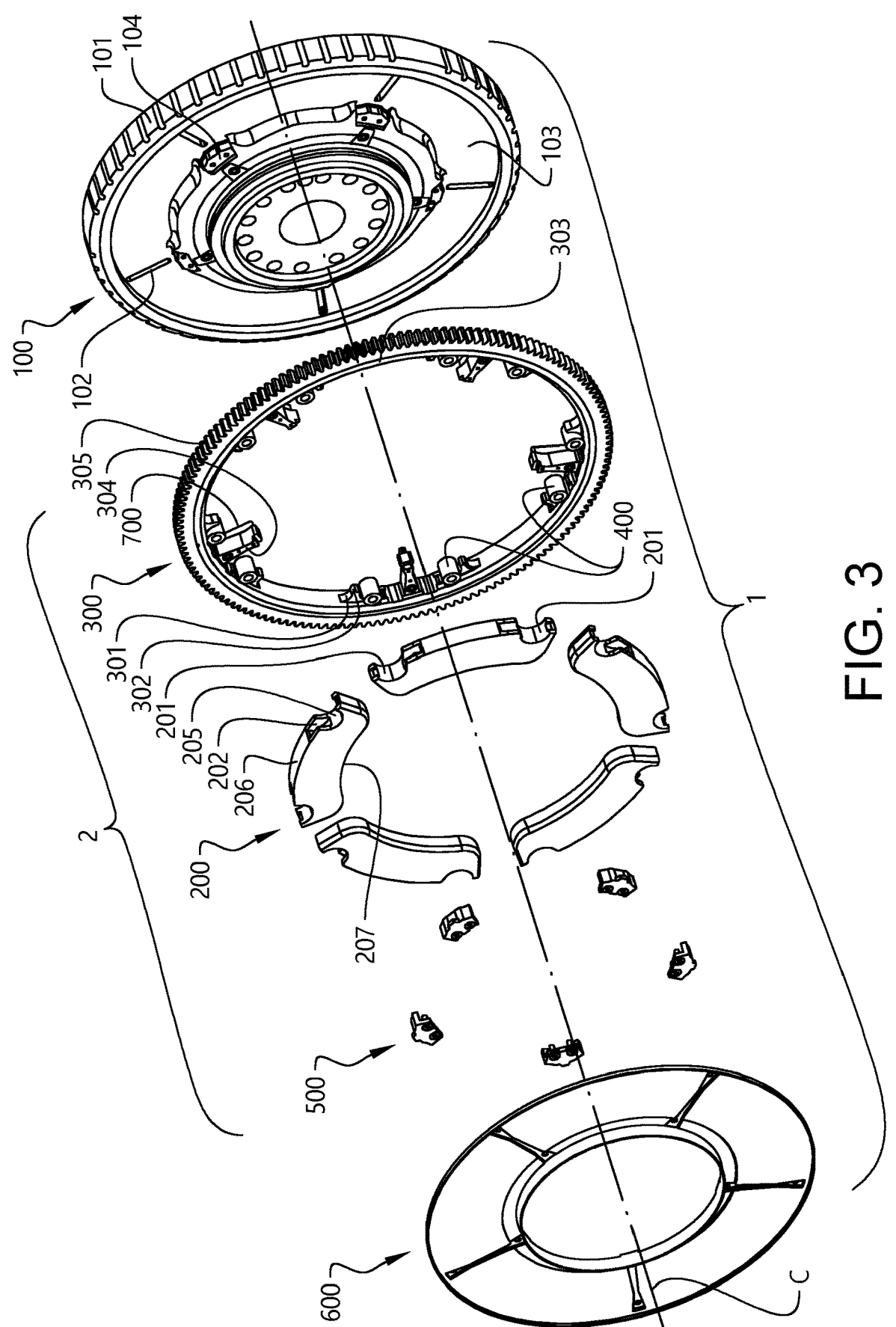
FIG. 3 is an exploded view of the flywheel arrangement in FIG. 2.
Figure 4:
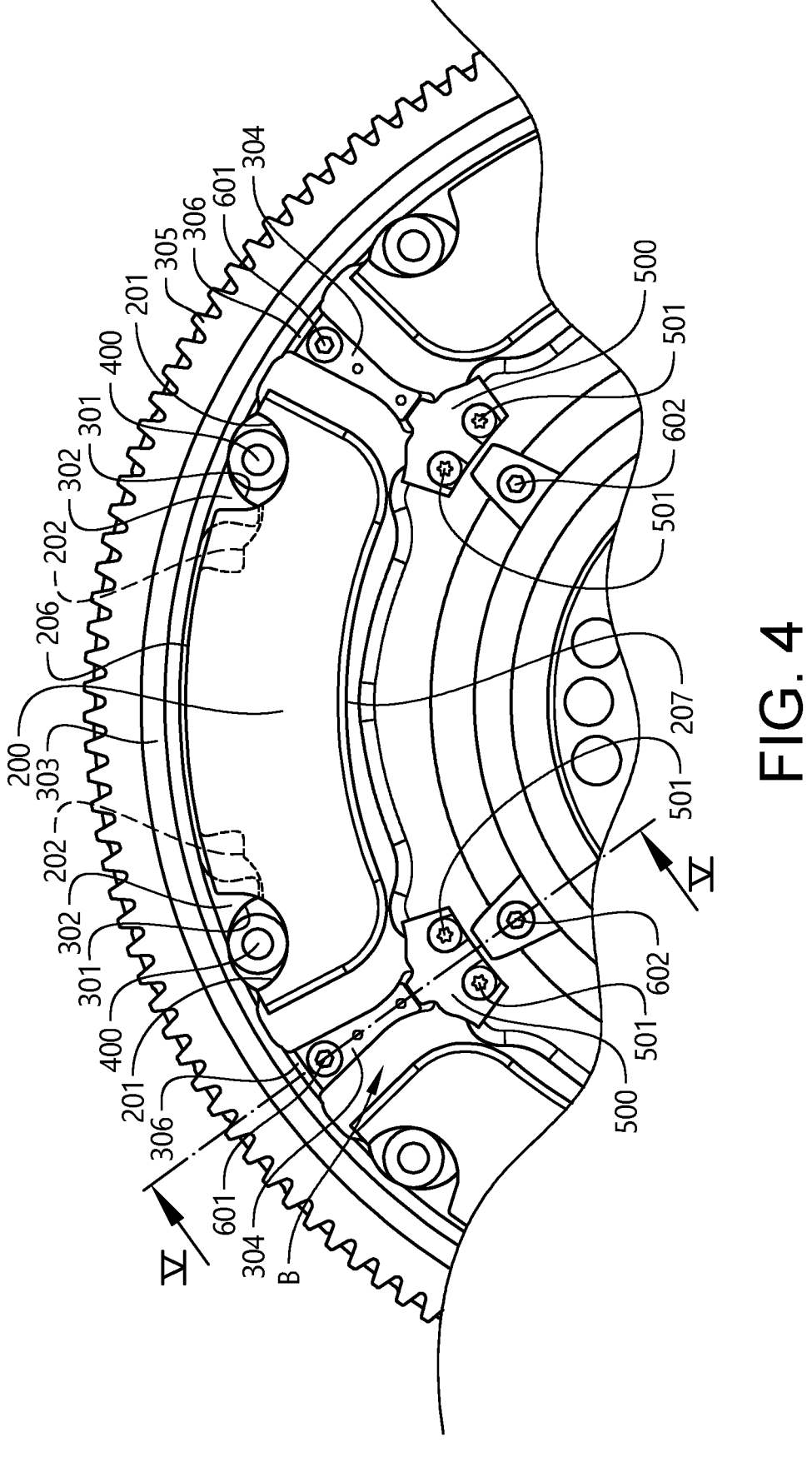
FIG. 4 is a planar view showing a portion of the flywheel arrangement in FIG. 2.

A flywheel arrangement 1 according to an embodiment of the invention is shown in closer detail in FIG. 2. Reference is also made to FIG. 3, in which the flywheel arrangement 1 is shown in an exploded view, and to FIG. 4, showing a portion of the flywheel arrangement in closer detail. The flywheel arrangement 1 includes a flywheel 100 configured to be connected to the crankshaft of the powertrain 4 for common rotation about a center axis C. A centrifugal pendulum absorber 2 is provided, comprising a plurality of pendulum weights 200, in the shown embodiment five pendulum weights 200, which are circumferentially arranged between the center axis C and a radially peripheral surface 101 of the flywheel 100, facing a side face 103 of the flywheel 100. Radially outside of the pendulum weights 200, a ring member 300 is arranged, connected for common rotation with the flywheel 100 around the center axis C.

Each pendulum weight 200 comprises two angularly spaced concavely curved inner bearing surfaces 201 facing the ring member 300. The ring member 300 in turn, for each pendulum weight 200, comprises two concavely curved outer bearing surfaces 301, each outer bearing surface 301 facing one of the inner baring surfaces 201. Thus, an outer bearing surface 301 and an inner bearing surface 201 together form a pair of cooperating bearing surfaces 201, 301. Between each pair of cooperating bearing surfaces 201, 301, a rolling element 400 in the form of a roller is positioned, configured to be in rolling contact with the bearing surfaces 201, 301. The pendulum weight 200 is thereby movable with respect to the flywheel 100 along a predetermined pendulum path, herein a tautochrone curve, which predetermined pendulum path is defined by the two pairs of cooperating bearing surfaces 201, 301 and the rolling elements 400.

The pendulum weight 200 has a basic shape of an annulus sector as seen in a plane (or section) perpendicular to the central axis C. Thus, an outer peripheral surface 206 of the pendulum weight 200, facing the ring member 300, is a convex surface with a first radius of curvature, and an inner peripheral surface 207 of the pendulum weight 200 is a concave surface with a second radius of curvature, which is smaller than the first radius of curvature. The inner bearing surfaces 201 are provided on recesses 205 formed in the outer peripheral surface 206 of the pendulum weight 200.

The pendulum weights may be formed in one piece, but they may also be formed as two pieces which are assembled to form the pendulum weight. For example, the pendulum weight may comprise a radially outward portion and a separate radially inward portion which are assemblable to form the pendulum weight, wherein the inner bearing surfaces and the pockets are provided on the outward portion. This facilitates mounting of the pendulum weights in the flywheel arrangement.

The ring member 300 comprises an annular main portion 303 and a plurality of protrusions 302 extending radially inwards from the annular main portion (303). The outer bearing surface 301 is formed at least partly on such a protrusion 302. The pendulum weight 200 comprises two pockets 202 formed in the outer peripheral surface 206 in connection with each of the inner bearing surfaces 201, wherein each pocket 202 is configured to receive a portion of one of the protrusions 302 during use of the flywheel arrangement 1, when the pendulum weight 200 moves along the predetermined pendulum path.

The ring member 300 further comprises a plurality of radially extending connection portions 304, extending radially inwards from the annular main portion 303. Each radially extending connection portion 304 is arranged between two neighbouring pendulum weights 200.

Figure 5:
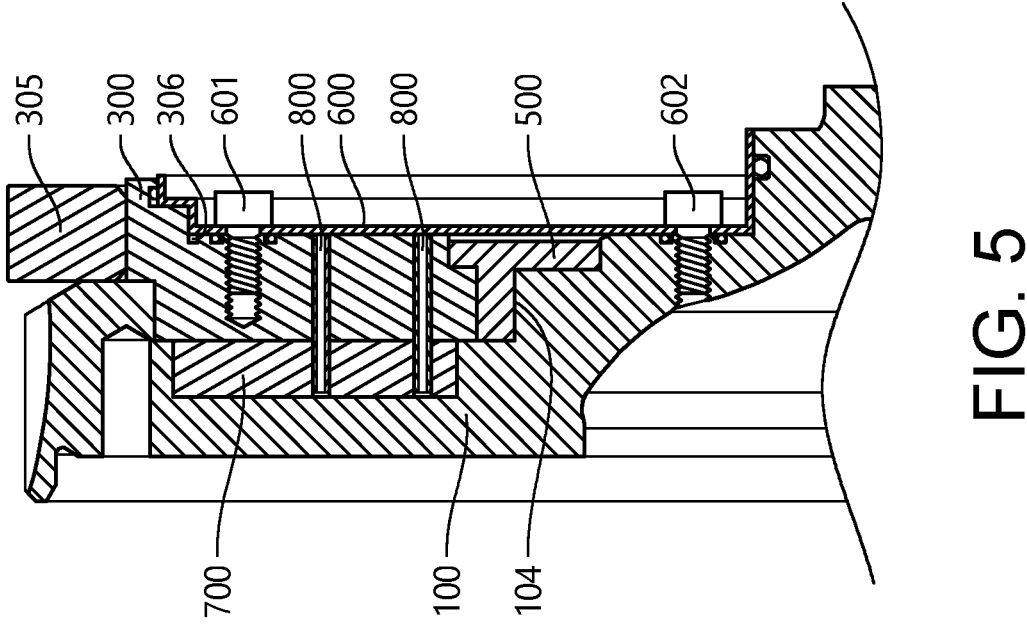
FIG. 5 is a cross-section along the line V-V in FIG. 4.

A plurality of key members 700 are further provided, by means of which the ring member 300 is secured to the flywheel 100. Each key member 700 is, as shown in a sectional view in FIG. 5, fitted into a radially extending keyseat 102 provided in the flywheel 100 and each key member 700 is further attached to the radially extending connection portion 304 of the ring member 300 using fastening members in the form of e.g. nails, pins or screws via a hole 800 extending through the ring member 300 and at least partly into the key member 700. The key members 700 and the ring member 300 may thus be formed as separate pieces, but they may also be formed in one piece. The key members 700 and the ring member 300 may be made of the same material.

The flywheel arrangement 1 further comprises a plurality of stopping elements 500, each stopping element 500 being located radially inwardly with respect to the at least one pendulum weight 200. Each stopping element 500 abuts a radially inner portion of the connection portion 304 and is attached to a seat 104 of the flywheel 100. It is positioned such that it defines end points of the predetermined pendulum paths of two neighbouring pendulum weights 200, at which end points the pendulum weights 200 are configured to come into contact with the stopping element 500. The stopping elements are fastened using screws 501.

The flywheel arrangement 1 further comprises a cover plate 600 mounted to the ring member 300 and to the side face 103 of the flywheel by means of screws 601, 602, which cover plate sealingly covers the pendulum weights 200 such that a plurality of closed compartments B are formed, each pendulum weight 200 being located in one of the closed compartments B. Extending between each two neighbouring closed compartments, a channel 306 for fluid is provided in-between the cover plate 600 and the connection portion 304 of the ring member 300, fluidly connecting the two compartments B. Thus, lubricant may flow between the closed compartments during use of the flywheel arrangement 1. It is to be noted that the cover plate 600 has been removed in FIGS. 2 and 4.

The ring member 300 further comprises a ring gear 305, which may be a separate part or which may be formed integrally with the ring member 300.

Figure 6:
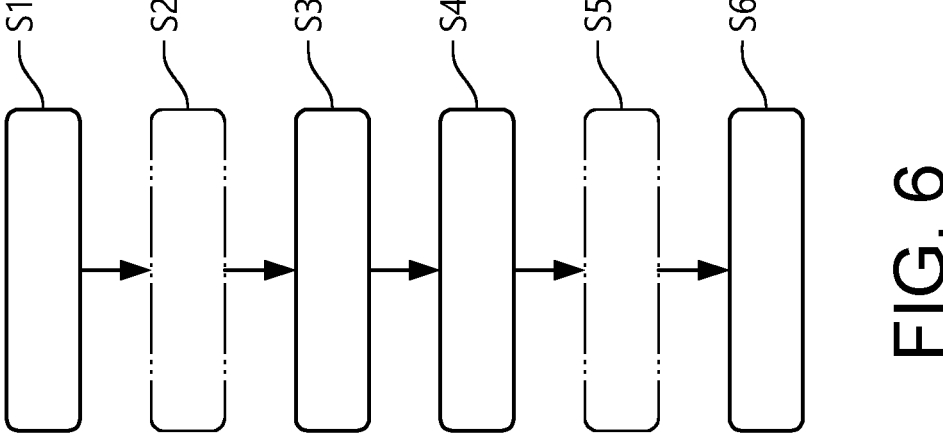
FIG. 6 is a flow chart schematically illustrating a method according to an embodiment of the invention.

FIG. 6 schematically shows a method of manufacturing a flywheel arrangement 1 according to an embodiment of the invention. Optional steps are marked with dashed lines.

In a first step S1, a flywheel 100 configured to receive the pendulum weights 200 and the ring member 300 is provided.

In an optional second step S2, a plurality of separate key members 700 are fitted into the keyseats 102 of the flywheel 100.

In a subsequent third step S3, the ring member 300 is press-fitted to the flywheel. In a fourth step S4, carried out after the third step S3, the ring member 300 is machined to form the outer bearing surfaces 301.

In the case where separate key members 700 were fitted in step S2, a fifth step S5 is carried out, in which radially extending connection portions 304 of the ring member 300 are attached to the plurality of key members 700, which have previously been fitted into the keyseats 102 of the flywheel 100.

In a sixth step S6, the pendulum weights 200 and, if applicable, the rolling elements 400, are mounted between the center axis C and the radially peripheral surface 101 of the flywheel 100. If assemblable pendulum weights are used, this step comprises assembling the pendulum weights in place.

The method may further comprise steps of attaching stopping members 500 and a cover plate 600 (not shown).

It is to be understood that the present invention is not limited to the embodiments described above and illustrated in the drawings; rather, the skilled person will recognize that many changes and modifications may be made within the scope of the appended claims.

The invention claimed is:

1. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;
a ring member positioned radially outside of the at least one pendulum weight, the ring member being connected for common rotation with the flywheel around the center axis; and
at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight,
wherein the flywheel is made of cast iron and the ring member is made of steel alloy,
wherein the outer bearing surface is formed at least partly on a protrusion of the ring member, the protrusion extending radially inwards from an annular main portion of the ring member, and
wherein the at least one pendulum weight comprises at least one pocket formed in connection with the inner bearing surface, the pocket being configured to receive at least a portion of the protrusion of the ring member when the pendulum weight moves along the predetermined pendulum path.

2. The flywheel arrangement according to claim 1, further comprising at least one rolling element positioned between and configured to cooperate with the at least one pair of cooperating bearing surfaces to provide the predetermined pendulum path.

3. The flywheel arrangement according to claim 1 wherein, for each pendulum weight, the at least one pair of cooperating bearing surfaces comprises two angularly spaced pairs of cooperating bearing surfaces.

4. A vehicle comprising a flywheel arrangement according to claim 1.

5. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;
a ring member positioned radially outside of the at least one pendulum weight, the ring member being connected for common rotation with the flywheel around the center axis; and
at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight,
wherein the flywheel is made of cast iron and the ring member is made of steel alloy,
wherein the flywheel is made of grey cast iron, and/or wherein the ring member is made of a bearing steel alloy.

6. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;
a ring member positioned radially outside of the at least one pendulum weight, the ring member being connected for common rotation with the flywheel around the center axis;
at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight; and
a plurality of separate key members by means of which the ring member is secured to the flywheel, each key member being fitted into a keyseat provided in the flywheel and attached to the ring member,
wherein the flywheel is made of cast iron and the ring member is made of steel alloy.

7. The flywheel arrangement according to claim 6, wherein the key members and the ring member are made of the same material.

8. The flywheel arrangement according to claim 6, wherein each key member is attached to a radially extending connection portion of the ring member.

9. The flywheel arrangement according to claim 8, wherein the at least one pendulum weight comprises at least two neighbouring pendulum weights, and wherein the radially extending connection portion is arranged between the two neighbouring pendulum weights.

10. The flywheel arrangement according to claim 6, wherein each key member is attached to the ring member by means of at least one fastening member, such as at least one pin.

11. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;
a ring member positioned radially outside of the at least one pendulum weight, the ring member being connected for common rotation with the flywheel around the center axis; and
at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight,
wherein the flywheel is made of cast iron and the ring member is made of steel alloy,
wherein the ring member is press-fitted to the flywheel.

12. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;
a ring member positioned radially outside of the at least one pendulum weight, the ring member being connected for common rotation with the flywheel around the center axis;
at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight; and
at least one stopping element positioned such that it defines an end point of the predetermined pendulum path, at which end point the at least one pendulum weight is configured to come into contact with the at least one stopping element, wherein the at least one stopping element is located radially inwardly with respect to the at least one pendulum weight,
wherein the flywheel is made of cast iron and the ring member is made of steel alloy.

13. A flywheel arrangement for an engine, comprising:
a flywheel configured to be connected to a crankshaft of the engine for common rotation around a center axis;
at least one pendulum weight arranged between the center axis and a radially peripheral surface of the flywheel, the at least one pendulum weight being movable with respect to the flywheel along a predetermined pendulum path;

a ring member positioned radially outside of the at least one pendulum weight, the ring member being connected for common rotation with the flywheel around the center axis;

at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight; and a cover plate provided on a side face of the flywheel, which cover plate sealingly covers the pendulum weights, wherein the flywheel is made of cast iron and the ring member is made of steel alloy.

14. A method of providing a flywheel arrangement for an engine, the method comprising:

connecting a flywheel to a crankshaft of the engine for common rotation around a center axis;

arranging at least one pendulum weight between the center axis and a radially peripheral surface of the flywheel, the at least one pendulum weight being movable with respect to the flywheel along a predetermined pendulum path;

positioning a ring member radially outside of the at least one pendulum weight, the ring member being connected for common rotation with the flywheel around the center axis;

providing at least one pair of cooperating bearing surfaces, each pair of cooperating bearing surfaces comprising an outer bearing surface provided on the ring member and an inner bearing surface provided on the at least one pendulum weight, the at least one pair of cooperating bearing surfaces together defining the predetermined pendulum path of the at least one pendulum weight;

providing the flywheel configured to receive the at least one pendulum weight and the ring member;

press-fitting the ring member to the flywheel and subsequently machining the ring member to form the at least one outer bearing surface;

mounting the at least one pendulum weight between the center axis and the radially peripheral surface of the flywheel;

prior to press-fitting the ring member, fitting a plurality of key members into keyseats of the flywheel, and after press-fitting the ring member, attaching radially extending connection portions of the ring member to the plurality of key members.

* * * * *